April 27, 1943.  H. FORD ET AL  2,317,597

DIE CONSTRUCTION

Filed July 17, 1940  2 Sheets-Sheet 1

Henry Ford
R. A. Boyer
INVENTORS

BY Edwin C. McRae
C. L. Davis
ATTORNEYS.

April 27, 1943.  H. FORD ET AL  2,317,597
DIE CONSTRUCTION
Filed July 17, 1940   2 Sheets-Sheet 2

Henry Ford
R. A. Boyer
INVENTORS.
BY Edwin C. McRae
E. L. Davis

Patented Apr. 27, 1943

2,317,597

UNITED STATES PATENT OFFICE 2,317,597

DIE CONSTRUCTION

Henry Ford, Dearborn, and Robert A. Boyer, Detroit, Mich., assignors to Ford Motor Company, Dearborn, Mich., a corporation of Delaware Application July 17, 1940, Serial No. 345,894

3 Claims. (Cl. 18—38)

The object of our invention is to provide a die construction especially adapted for use in molding relatively large plastic articles.

In the molding of such articles it is necessary that the plastic material be compressed in a die under a relatively high pressure, so that the die must be formed of a material having high compressive strength. The plastic material must also be heated to a temperature of 200° or 300° F. during the curing process while the material is held in compression at this heat. The molded article must then be cooled down to substantially room temperature before it is safe to remove same from the die.

Because of these limitations it has heretofore been necessary to provide iron die blocks having mold cavities therein which are machined to the shape of the part being formed. Means for bringing these blocks up to temperature must be provided and water cooling arranged so that the dies may be rapidly cooled down after each molding cycle. The disadvantage of such die construction for large articles is apparent because the relatively large volume of the die requires an enormous amount of heat to bring these die members up to working temperature. This heat is, of course, lost when the dies are cooled down between each cycle. Furthermore, much time is required to heat and cool the dies between each cycle of operation so that this materially slows down the production of parts from such dies.

The object of our invention is to provide a die which will withstand the pressure involved in molding relatively large articles of plastic material and which may be rapidly heated to operating temperature and rapidly cooled down with the loss of only a fraction of the heat heretofore required.

Still a further object of our invention is to provide a plastic die having a mold cavity formed from relatively thin sheet metal which will have ample strength for the purpose intended. When iron dies are provided it is necessary to finish such dies upon a profiling machine and, in the case of dies of large size, the amount of work entailed is considerable. With our improved construction it is only necessary to line the die cavity with comparatively thin sheet metal which may be hammered and filed to shape. An enormous saving in die cost is had where the dies are used in forming only a relatively few parts.

Still a further object of our invention is to provide a die construction which is brought up to temperature by induction heating. High frequency alternating current coils induce energy into the above-described sheet metal cavity linings to rapidly heat such lining to operating temperature without heating the remainder of the die appreciably.

With these and other objects in view, our invention consists of the arrangement, construction and combination of the various parts of our improved device, as described in this specification, claimed in our claims, and illustrated in the accompanying drawings, in which:

Figure 2:
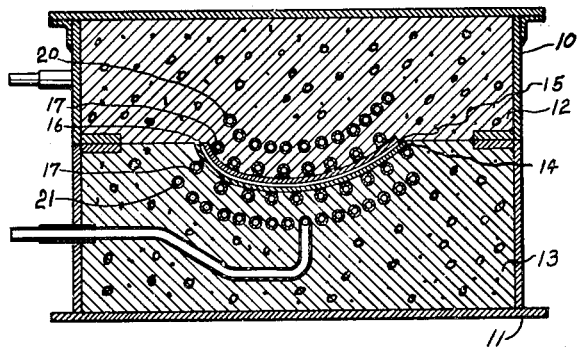
Figure 2 is a sectional view, taken upon the line 2—2 of Figure 1.

Referring to the accompanying drawings, we have used the reference numerals 10 and 11 to indicate, respectively, boxed shape top and bottom die housings. These housings are formed of steel plates which are welded together. Each housing is several times larger than the part to be molded and forms the outer walls of the completed die. The housing 10 is adapted to be inverted over the housing 11, as shown in Figure 2.

The housings 10 and 11 are cast with monolithic blocks 12 and 13 therein, these blocks being formed of Portland cement. When the housings are assembled, one on the other, the top surface of the lower block 13 is complementary to the bottom surface of the upper block 12 to form a conventional mold parting line. The die cavity is formed in these abutting surfaces. A relatively thin sheet metal cavity liner 14 is embedded in the upper face of the block 13, and a liner 15 is likewise cast in the parting face of the block 12, these two liners being so shaped that a die cavity 16 is formed therebetween.

Figure 3:
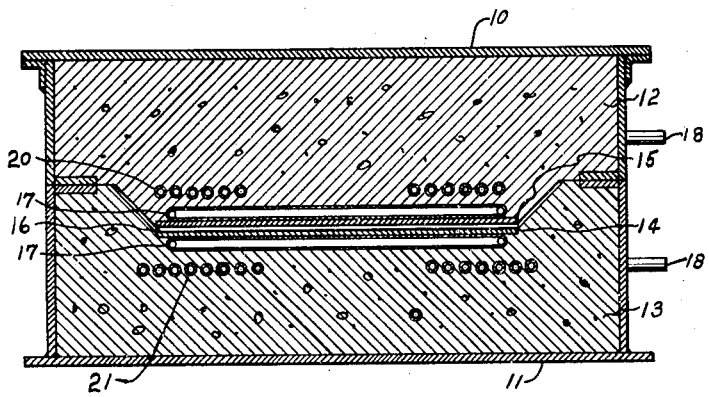
Figure 3 is a sectional view, taken upon the line 3—3 of Figure 1.
Figure 1:
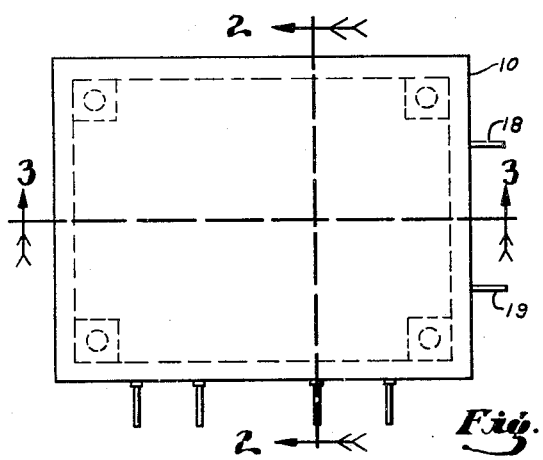
Figure 1 is a plan view of our improved die construction.
Figure 4:
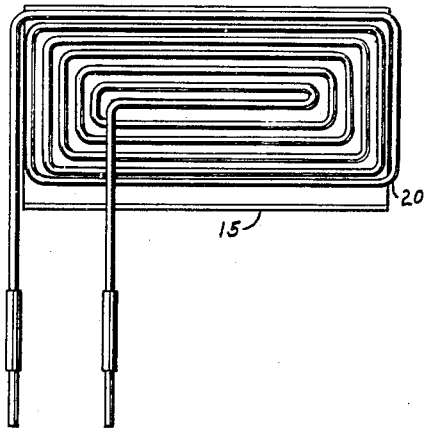
Figure 4 is a plan view of one of the induction heating coils used in each half of the die and, Figure 5 is a plan view of one of the die linings, showing the associated cooling coil.

The die shown is adapted to produce a motor vehicle glove-box door of curved section, this door being flat in one plane, as shown in Figure 3, and curved in the other plane, as shown in Figure 2. The liners 14 and 15 form the die surfaces, the cement blocks 12 and 13 simply supporting these liner members. The die, when in the position shown, is closed, at which time the die cavity 16 is of the size and shape of the desired molded article.

Figure 5:
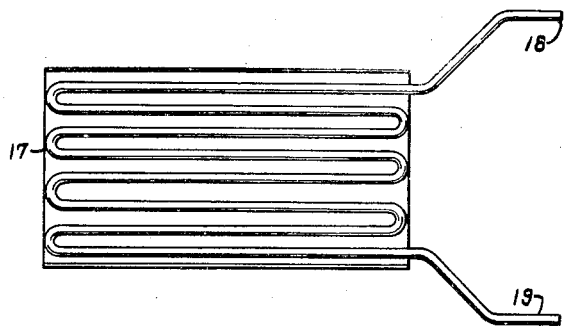

It will be noted from Figure 5 that noninductive cooling coils 17 are brazed to the imbedded surface of each of the liners 14 and 15, so that water which may flow through these coils will cool the adjacent liners in a minimum of time. These coils may be fabricated from copper, brass, aluminum or any other noninductive metal. In the present construction, we prefer to make them of brass or copper, which may be readily soldered to the back of the liners to improve the heat conduction therethrough. The word "noninductive" as used above is to be construed as covering those metals which, under the influence of inductive heating currents, are heated to lower temperatures than that obtaining in the steel face to which they are attached. It has been established that the penetration of the inductive current in a metallic object varies directly as the square root of the resistivity of the object and inversely as the square root of the current in the inductor. Comparison of the resistivities of copper, brass, or aluminum with the steel used in the die face will show that the penetration in the cooling coil would be substantially less. Furthermore, these materials are also nonmagnetic, and it has likewise been established that the comparable heating of nonmagnetic materials requires higher frequencies than obtained for the heating of magnetic materials. Flowing from these two characteristics, it will be found that with a given frequency and current in the inductor, the heat penetration in the "noninductive" coil will be much less than that in the steel die and the heating effect on the coil will also be less than that of the die. As a consequence, the tendency to form areas of unequal heating over the face of the steel die by reason of the coil secured therebehind is minimized. Each of the coils is provided with inlet and outlet connections 18 and 19 respectively, which extend outwardly through suitable openings in the sides of the housing. These connections are fastened to flexible rubber tubes which extend to a suitable source of cooling water. Thus, when cold water is supplied to the coils 17 the liners 14 and 15 will be cooled very rapidly because, the liners being thin, the amount of heat therein is very small.

It will also be noted that we have provided a pair of induction heating coils 20 and 21, which coils are imbedded in the cement blocks 12 and 13, respectively. The coil 20 is of such shape that it follows the general contour of the liner 15, while the coil 21 is likewise so shaped that it follows the contour of the liner 14.

These coils are formed of copper tubing and are imbedded in the cement a couple of inches below the liner members which they are designed to heat. Cooling water is run through these coils in the usual manner for induction heating.

In assembling the lower half of the die the housing 11 is filled about two-thirds full of cement and the coil 21 is imbedded therein. More cement is poured over the coil 20 and the liner 14 imbedded therein. The liner 14 has previously been brazed to the coil 17. The top surface of the cement is then smoothed off to form a relatively flat abutting surface. The cement block is then allowed to harden.

The upper half of the die is made using the housing 10 as a cope, the cement being used in the same way that sand is used in ordinary foundary practice to form a mold.

In the operation of our improved mold structure the coils 20 and 21 are connected with a suitable source of cooling water and then energized by high frequency alternating current. This induces energy into the thin liners 14 and 15 to thereby heat these liners to their working temperature very quickly. A temperature of around 350° F. is usually required for molding most plastics and this is obtained in a very few minutes even with large dies. The cement blocks 12 and 13, being nonmetallic and relatively poor heat conductors, are not heated to any appreciable extent by this operation so that the main bodies of the blocks remain cold.

After the dies have been heated to the desired temperature they are opened and the correct amount of plastic powder is placed in the bottom die cavity and then the top member brought down into place. Preforms are often used instead of loose powder. A relatively high pressure must be exerted upon the die members while the powder is curing but the cement is amply able to stand up under the required pressure.

After the mold has been held under compression for the desired length of time the current is disconnected from the heating coils and cool water is forced through the coils 17 to thereby rapidly cool the liners 14 and 15. This, of course, cools the part which has just been formed and causes the part to set. The dies may then be immediately parted and the article removed. The die is again heated and the aforementioned sequence of operations repeated.

Among the many advantages arising from the use of this die structure it may be well to mention that these dies are relatively inexpensive to produce, costing only a fraction of that heretofore necessary to produce iron dies for this work. Furthermore, the cost of heating and cooling these dies is only a fraction of that required to cool iron dies because only the relatively thin liners need be heated and cooled, whereas it is necessary with iron dies to heat and cool the whole die structure.

Still a further advantage results in that the cement permits the introduction of induction heating coils to much better advantage than could be done with a solid iron die structure.

Some changes may be made in the arrangement, construction and combination of the various parts of our improved die without departing from the spirit of our invention and it is our intention to cover by our claims such changes as may reasonably be included within the scope thereof.

We claim as our invention:

1. A mold of the character described comprising, a monolithic block having a die cavity formed therein, said cavity having a relatively thin steel lining, the outer surface of which is imbedded in said block, a cooling coil fixed to the outer surface of said lining, and an induction coil imbedded in said block adjacent to said lining.

2. A mold of the character described comprising a monolithic block of material having a relatively low coefficient of thermal conductivity and having a die cavity formed therein, a relatively thin steel lining fitting within said cavity, a plurality of spaced cooling tubes adjacent the back of said lining and secured thereto, said cooling tubes being imbedded in the material of said block, and an induction coil imbedded in the material of said block, spaced from said cooling tubes.

3. In a mold of the character described comprising a monolithic block, one face of said block having a die cavity formed therein, a thin sheet of steel lining said cavity, the exposed face thereof defining the die surface, a plurality of spaced cooling tubes adjacent the back of said thin sheet and connected thereto, said tubes being formed of a nonmagnetic material of low resistivity, an electrical induction coil imbedded in said block and spaced inwardly from said cooling tubes, whereby said lining may be heated by induction from said coil and cooled by fluid circulated through said tubes, the temperature of said monolithic block remaining substantially unchanged throughout.

HENRY FORD.
ROBERT A. BOYER.